June 29, 1965   C. J. PENK   3,191,967
DIRECTION CONTROL TRAILER HITCH
Filed Feb. 7, 1963   2 Sheets-Sheet 1
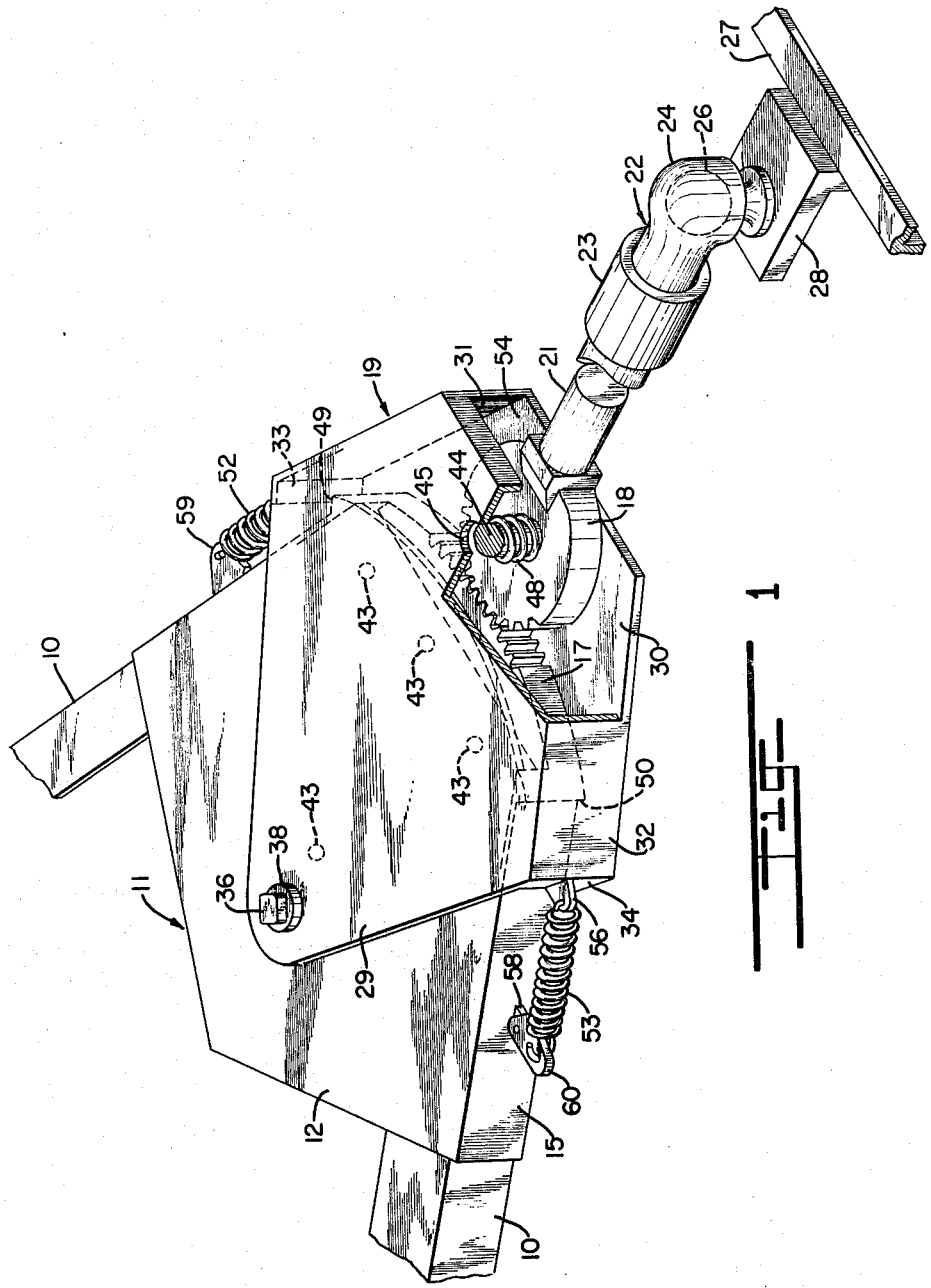
INVENTOR.
CONRAD J. PENK
BY
ATTORNEY

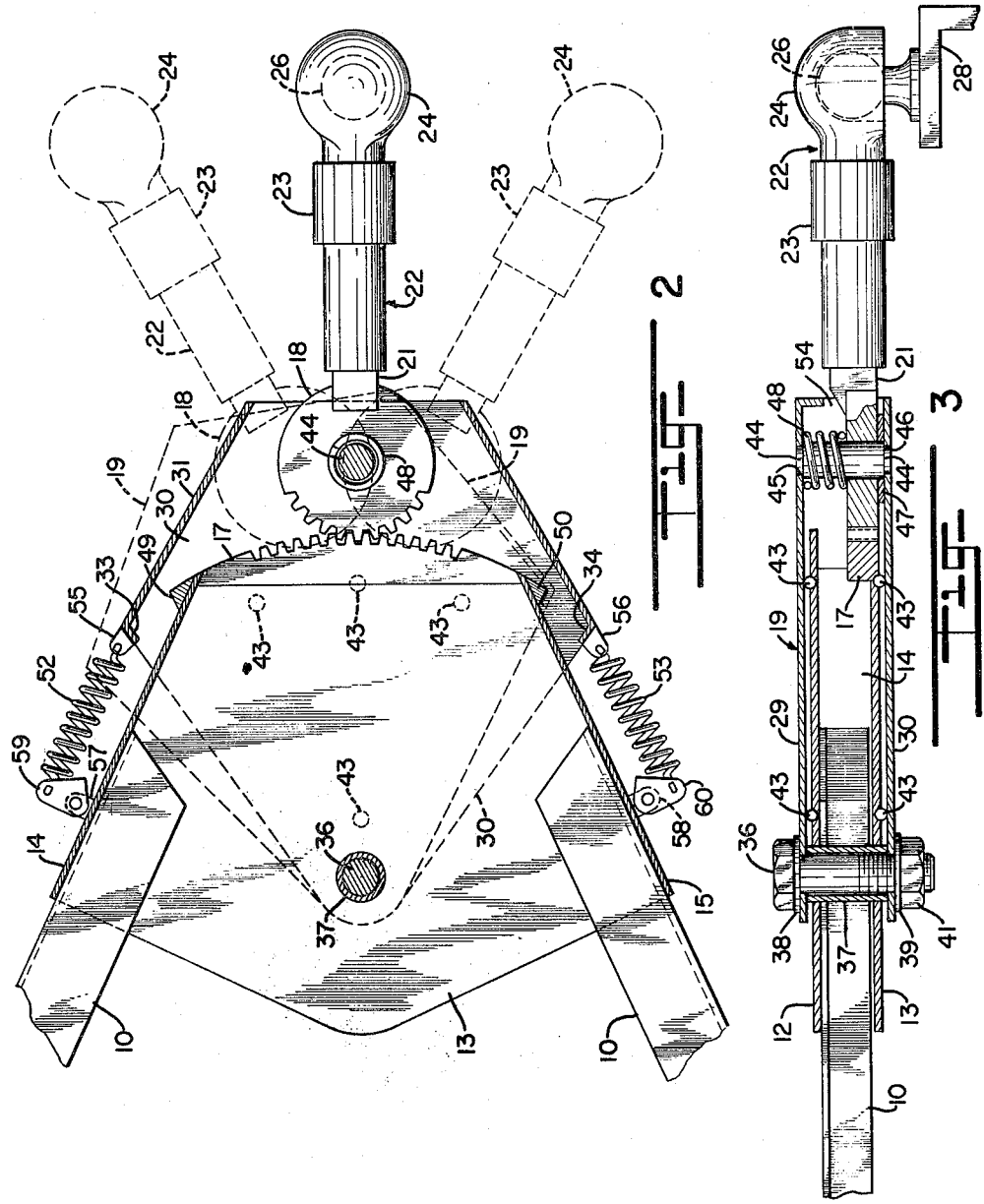

United States Patent Office 3,191,967
Patented June 29, 1965

3,191,967
DIRECTION CONTROL TRAILER HITCH
Conrad J. Penk, 506 Arapahoe Ave., Boulder, Colo.
Filed Feb. 7, 1963, Ser. No. 256,969
7 Claims. (Cl. 280—448)

This invention relates to a drawbar or coupling mechanism for use between a draft vehicle and a drawn vehicle and particularly to a trailer hitching device.

Conventional trailer hitching devices which are mounted on the trailer in a fixed position afford maneuverability of the trailer or draft vehicle but invariably not in the desired direction and such is a definite limitation. This limitation is especially noticeable when it is desired to simultaneously back the trailer and move it in a lateral direction, such as in the case of parking the trailer in a parking area such as along a curb. In such case, as the draft vehicle is backed toward the curb the trailer moves away from the curb. Such conventional trailer hitching devices also are hazardous when drawn on curved sections of a road or highway, where the trailer over-runs or turns through a larger arc than the draft vehicle and may strike oncoming vehicles or sideswipe adjacent vehicles. Furthermore, under such conditions, jack-knifing is a danger when the draft vehicle is stopped or slowed down while on a curve.

Accordingly, it is an important object of this invention to provide a coupling mechanism for use between a draft vehicle and a drawn vehicle which will afford a maximum amount of maneuverability in the desired direction for the drawn vehicle.

Another object of this invention is to provide such a coupling or drawbar mechanism which will mitigate the dangers of over-running or jack-knifing on curves.

Additional objects will become apparent from the following description, which is given primarily for purposes of illustration, and not limitation.

Stated in general terms, the objects of this invention are attained by providing a drawbar mechanism which, in addition to means for coupling the mechanism to a draft vehicle, includes a shaft connected to a rotatably mounted gear, or pinion gear, which in turn is meshed with a second gear. The shaft is mounted for pivotal movement relative to the draft vehicle and to impart corresponding rotational movement to the rotatably mounted gear connected to the shaft. The second gear is attached to a drawn vehicle. A cover, or enclosure, is pivotally mounted on the drawn vehicle and serves to enclose both gears. A loaded spring, such as a spiral spring, is mounted axially on the rotatably mounted gear to provide a degree of frictional resistance to rotational movement thereto. The rotatably mounted gear also is adapted to rotate with pivotal movement of the shaft. The second gear is adapted to orient the drawn vehicle, or trailer, so that the movements thereof correspond substantially with the movements of the draft vehicle, or track. The cover preferably is adapted to pivot with the shaft control. Springs preferably are attached to the cover to impart smooth performance thereto.

A more detailed description of a specific embodiment of the invention is given below with reference to the appended drawings, wherein:

FIGURE 1 is an isometric view, with a portion cut away, showing a trailer hitch of the invention mounted on the front end of a trailer and coupled to the rear end of a draft vehicle;

FIGURE 2 is a plan view, partially in horizontal section, showing in phantom relative displacements of parts of the hitch mechanism of FIGURE 1 during right and left turns; and FIGURE 3 is a side elevational view of the trailer hitch of FIGURES 1 and 2 partially in vertical section, showing details of the trailer hitch mechanism.

In the specific embodiment of the drawings, the trailer hitch mechanism is shown permanently attached to the projecting frame 10 at the front end of the trailer. The trailer may be a horse van, boat trailer, moving trailer, etc. The trailer mechanism includes a platform 11 which consists of an upper plate 12, lower plate 13 and side plates 14 and 15. Platform 11 is attached to frame 10 by suitable means such as welding, riveting, bolting, etc., so that side plates 14 and 15 form a continuation of frame 10.

A section of a gear 17 which is fixed to the forward end of platform 11 to form a third side thereof together with side plates 14 and 15, and in effect a front end frame member complementing the side plates and frame 10. A pinion gear 18, constituting drive means, is pivotally mounted in meshed relationship with gear section 17, constituting driven means, in a cover or enclosure 19. Pinion gear 18 is connected to a shaft 21, which in turn is integrally connected to a hitch 22 by welding or the like. The hitch 22 includes a female coupling member 24 which is coupled conventionally to ball hitch 26 carried at the rear end 27 of a draft vehicle, such as a pickup truck or touring car, for example, on a bracket 28. Sleeve 23 forms the conventional locking means to secure elements 24 and 26.

Cover 19 consists of a top plate 29, a bottom plate 30 and sides 31 and 32 and 33 and 34. Sides 33 and 34 are made relatively short so that top plate 29 and bottom plate 30 of cover 19 can be made to extend over and cover a large portion of top plate 12 and bottom plate 13, respectively, of platform 11. Cover 19 is pivotally mounted in covering or enclosing relationship with platform 11 by bolt 36. Pivot bolt 36 is inserted in a sleeve 37, passed through aligned apertures in top plate 12 and bottom plate 13 of platform 11, and through aligned apertures in top plate 29 and bottom plate 30 of cover 19. Bolt 36 is provided with washers 38 and 39 and is secured by a lock nut 41. Ball bearings 43 are mounted in sockets formed in top plate 12 and bottom plate 13 of platform 11 and in engagement with top plate 29 and bottom plate 30, respectively, for maintaining spaces between adjacent plates and minimizing friction when cover 19 pivots relative to platform 11.

Pinion gear 18 surrounds a center pin 44 which passes through the pinion gear and has its shouldered ends keyed into apertures 45 and 46 formed in top plate 29 and bottom plate 30, respectively, of cover 19. A washer 47 is mounted around pin 44 between pinion gear 18 and bottom plate 30 of cover 19 and a loaded helical coil spring 48 is mounted around pin 44 and between pinion gear 18 and top plate 29 of cover 19. Spring 48 provides some degree of resistance to movement of cover 19, pinion gear 18, shaft 21, and washer 47 serves its usual function as a separator. Projecting stop members 49 and 50 are attached to sides 14 and 15, respectively, of platform 11 to engage sides 33 and 34, respectively, of cover 19 and thus limit the pivotal movement of the cover and of pinion gear 18 and shaft 21. During said pivotal movement pin 44 moves along a radius centered on pin 36.

A pair of spiral control springs 52 and 53 are employed to produce smooth, controlled performance. The forward ends of springs 52 and 53 are attached to ears 55 and 56, respectively. Ears 55 and 56, are, in turn, fixed to sides 33 and 34, respectively, of cover 19. The rearward ends of springs 52 and 53 are attached to ears 57 and 58, respectively, through pivot links 59 and 60, respectively. Ears 57 and 58 are, in turn, fixed to sides 14 and 15, respectively, of platform 11.

In operaton, when the draft vehicle 27 is backed and moved laterally toward a parking area such as a curb, for example, for parking the trailer, as shaft 21 turns in one direction, or the other, as shown in phantom in FIGURE 2, pinion gear 18 turns correspondingly, and moves a corresponding distance laterally by reason of the meshing of the teeth of the pinion gear in those of gear wheel section 17. This in turn causes the trailer to turn correspondingly laterally toward the curb substantially parallel with the draft vehicle 27, and to move backward and laterally in a path at all times substantially parallel with that being traced out by the draft vehicle. Both the draft vehicle 27 and the trailer are parked simultaneously along the curb in greatly facilitated fashion as compared to the difficult operation experienced with conventional trailer hitches mounted on the trailer in a fixed position.

On a curved section of a road or highway, the trailer travels in a path having a slightly greater radius of curvature than is the case where conventional drawbar mechanisms are used due to the interaction of the gears 17 and 18 upon pivotal movement of the hitch 22, i.e., a clockwise movement of the hitch 22 about pin 44 will result in a counterclockwise moment being applied to the trailer about pin 36, as viewed in FIGURE 2, and thus causes the trailer to travel in a path having a slightly greater radius of a curvature than would normally be the case where conventional drawbar mechanisms are involved. Consequently, overrunning of the path of the draft vehicle is essentially eliminated thereby greatly minimizing the chances of such accidents as side-swiping or collisions with oncoming vehicles on curves.

Danger of jack-knifing also is minimized as a result of the follow-the-leader characteristics of the trailer hitch of the invention described above. In addition, stops 49 and 50, coacting with sides 33 and 34, respectively, limit the angular orientation of the trailer and thus tend to reduce jack-knifing difficulties. In addition, springs 52 and 53 tend to automatically insure smooth overall performance. It should also be observed that the present invention permits pivoting of hitch 22 along the lines of FIGURE 2 manually and this obviously eases and simplifies the burden of the hitching process.

It will be understood that the structure and construction of the trailer hitch of the invention can be varied or modified. For example, a manual control arm or wheel can be attached to the top of pin 44 for manual control to increase or reduce compression on coil spring 48 or to turn pinion gear 18. Pinion gear 18 and pin 44 can be made of unitary construction, if desired.

Obviously, many other modifications and variations of the trailer hitch of the present invention are possible in the light of the teachings given hereinabove. It is, therefore, to be understood that, within the scope of the appended claims, the invention can be practiced otherwise than as specifically described.

What is claimed is:

1. A drawbar mechanism which comprises a coupling means for attaching a draft vehicle to a drawn vehicle, said coupling means being constructed for mounting on a draft vehicle and providing a pivotal connection at least in a horizontal plane, a member adapted to be pivotally mounted on a drawn vehicle, a first gear means fixedly connected to said coupling means for movement therewith and rotatably mounted on said member, and a second gear means in meshed relationship with said first gear means and adapted to be attached to a drawn vehicle, said member being adapted to pivot and said first gear means being adapted to rotate and transmit a force through said second gear means in a direction transverse of the longitudinal axis of said coupling means upon pivotal movement of said coupling means whereby the drawn vehicle, during a backing operation, moves in substantially the same direction as the draft vehicle.

2. A drawbar mechanism which comprises a coupling means for attaching a draft vehicle to a drawn vehicle, said coupling means being constructed for mounting on a draft vehicle and providing a pivotal connection at least in a horizontal plane, a shaft means connected to the coupling means for movement therewith, a cover member adapted to be pivotally mounted on a drawn vehicle, a first gear means fixedly connected to the shaft means for movement therewith and rotatably mounted in said cover means, a second gear means in meshed relationship with said first gear means and constructed for attachment to a drawn vehicle, said cover means enclosing said first and second gear means, and said first gear means being adapted to rotate and transmit a force through said second gear means in a direction transverse of the longitudinal axis of said shaft means upon pivotal movement of said coupling means and said shaft means whereby the drawn vehicle, during a backing operation, moves in substantially the same direction as the draft vehicle, and said cover means being adapted to pivot with said shaft means.

3. A drawbar mechanism which comprises a coupling means for attaching a draft vehicle to a drawn vehicle, said coupling means being constructed for mounting on a draft vehicle and providing a pivotal connection at least in a horizontal plane, a shaft means connected to the coupling means for movement therewith, a cover means adapted to be pivotally mounted on a drawn vehicle, a first gear means fixedly attached to the shaft means for movement therewith and rotatably mounted in said cover means, a second gear means in meshed relationship with the first gear means and constructed for attachment to a drawn vehicle, said cover means enclosing said first and second gear means, a loaded spring means mounted axially on said first gear means for providing a degree of frictional resistance to rotational movement thereof, said cover means being adapted to pivot and said first gear means being adapted to rotate and transmit a force through said second gear means in a direction transverse to the longitudinal axis of said shaft means upon pivotal movement of said shaft means, whereby the drawn vehicle, during a backing operation, moves in substantially the same direction as the draft vehicle, and said cover means being adapted to pivot with said shaft means.

4. A drawbar mechanism which comprises a coupling means for attaching a draft vehicle to a drawn vehicle, said coupling means being constructed for mounting on a draft vehicle and providing a pivotal connection at least in a horizontal plane, a shaft means connected to the coupling means for movement therewith relative to the draft vehicle, a cover means constructed for pivotal mounting on a drawn vehicle, a first gear means fixedly attached to the shaft means and rotatably mounted in said cover means, a second gear means in meshed relationship with the first gear means and adapted to be attached to a drawn vehicle, said cover means enclosing said first and second gear means, a loaded spring means mounted axially on said first gear means for providing a degree of frictional resistance to rotational movement thereof, said cover means being adapted to pivot and said first gear means being adapted to rotate and transmit a force through said second gear means in a direction transverse of the longitudinal axis of said shaft means upon pivotal movement of said shaft means whereby the drawn vehicle, during a backing operation, moves in substantially the same direction as the draft vehicle, and control spring means atached to said cover means for biasing said cover means to a central position.

5. A drawbar mechanism which comprises a coupling means adapted to be pivotally mounted to a draft vehicle for intercoupling a drawn vehicle thereto, said coupling means being constructed for mounting on a draft vehicle and providing a pivotal connection at least in a horizontal plane, drive means fixedly connected to the coupling means for movement therewith, driven means adapted to be attached to a drawn vehicle, and means for maintaining said drive and driven means in driving relationship and for transmitting a force through said driven means in a direction transverse to the longitudinal axis of said coupling means upon pivotal movement of said coupling means whereby a drawn vehicle, during a backing operation, moves in substantially the same direction as the draft vehicle.

6. An apparatus for attaching a draft vehicle to a drawn vehicle comprising a pair of members, said members being pivotally connected to each other and a first one of said members providing a pivotal connection to a draft vehicle and a second one thereof being adapted to be pivotally connected to a drawn vehicle, said first one of sai dmembers providing a pivotal connection to said draft vehicle in at least a horizontal plane, first means fixedly attached to said first member for cooperation with a second means mounted on a drawn vehicle for transmitting a force through said second means to a drawn vehicle in a direction transverse of the longitudinal axis of said first member upon pivotal movement of said first member whereby a drawn vehicle, during a backing operation, moves in substantially the same direction as the direction of movement of the draft vehicle.

7. An apparatus for intercoupling a draft vehicle and a drawn vehicle comprising a pair of members including three pivot points, said members having a first common pivot point, a second pivot point adapted to be mounted on a draft vehicle and a third pivot point adapted to be mounted in a drawn vehicle, said second pivot point being formed upon a first one of said members and said third pivot point being formed on a second one of said members, and means fixedly attached to the first one of said pair of members and adapted for rotatable movement about said common pivot point upon pivotal movement of said first member about said second pivot point for contacting a portion of a drawn vehicle for transmitting a force thereagainst in a direction transverse of the longitudinal axis of said first member to produce a moment about the third pivot point whereby a drawn vehicle, during a backing operation, is moved in substantially the same direction as the direction of movement of the draft vehicle.

References Cited by the Examiner

UNITED STATES PATENTS

| 1,776,978 | 9/30 | Paradis et al. | 280—488 |
| 2,092,597 | 9/37 | Benjamin et al. | 280—447 |
| 2,233,988 | 3/41 | Piper | 213—20 |
| 2,529,868 | 11/50 | Connors | 280—459 |
| 2,898,125 | 8/59 | Burch | 280—447 |

FOREIGN PATENTS 202,133  3/39  Switzerland.

A. HARRY LEVY, *Primary Examiner.*

LEO FRIAGLIA, *Examiner.*